US012647533B2

(12) United States Patent
  Loudon

(10) Patent No.:  US 12,647,533 B2
(45) Date of Patent:      Jun. 2, 2026

(54) CONFIGURING A VIRTUALISED ENVIRONMENT IN A TELECOMMUNICATIONS NETWORK

(71) Applicant: Alianza, Inc., Pleasant Grove, UT (US)

(72) Inventor: Calum Sutherland Loudon, Edinburgh (GB)

(73) Assignee: Alianza, LLC, Pleasant Grove, UT (US)

( * ) Notice: Subject to any disclaimer, the term of this patent is extended or adjusted under 35 U.S.C. 154(b) by 555 days.

(21) Appl. No.: 18/026,338

(22) PCT Filed: Sep. 17, 2021

(86) PCT No.: PCT/US2021/050953
  § 371 (c)(1),
  (2) Date: Mar. 14, 2023

(87) PCT Pub. No.: WO2022/061167
  PCT Pub. Date: Mar. 24, 2022

(65) Prior Publication Data
  US 2023/0353709 A1     Nov. 2, 2023

(30) Foreign Application Priority Data
  Sep. 18, 2020    (GB) ..................................... 2014713

(51) Int. Cl.
  *H04N 7/15*        (2006.01)
  *G06F 3/01*        (2006.01)
  *H04N 7/14*        (2006.01)
(52) U.S. Cl.
  CPC ............. *H04N 7/157* (2013.01); *G06F 3/017* (2013.01); *H04N 7/147* (2013.01)

(58) Field of Classification Search
  CPC ......... H04N 7/157; H04N 7/147; G06F 3/017
  See application file for complete search history.

(56) References Cited

U.S. PATENT DOCUMENTS 10,135,925 B2 * 11/2018 Inagaki .............. H04L 67/1097
2016/0204923 A1   7/2016 Ashok et al.
(Continued)

FOREIGN PATENT DOCUMENTS

EP         2388699 A1    11/2011

OTHER PUBLICATIONS

"Search Report Issued In United Kingdom Application No. 2014713. 8", Mailed Date: Jun. 23, 2021, 2 Pages.
(Continued)

*Primary Examiner* — Amal S Zenati
(74) *Attorney, Agent, or Firm* — Maschoff Brennan

(57) ABSTRACT

Configuring a virtualized environment in a telecommunications network is described. A plurality of primary virtual workloads are configured, including a first primary virtual workload, to use first processing resources on at least one host device in the network. A plurality of secondary virtual workloads are configured, including a first secondary virtual workload and a second secondary virtual workload, to use second processing resources on at least one host device in the network, each of the plurality of secondary virtual workloads being associated with a respective one of the primary virtual workloads. The secondary virtual workloads contend with one another. Causing, as part of a failover procedure, a processing resource access priority such that additional processing resources on at least one host device in the network are available to the first secondary virtual workload and not available to the second secondary virtual workload.

20 Claims, 5 Drawing Sheets

200

210  Configure primary virtual workloads to use first processing resources

220  Configure secondary virtual workloads, including first and second secondary virtual workloads, to use second processing resources 230  Cause processing resource access priority of first secondary virtual workload to be higher than processing resource access priority of second secondary virtual workload as part of a failover procedure

(56)          References Cited

U.S. PATENT DOCUMENTS

2016/0255126 A1 *   9/2016   Sarris ................. H04L 65/1096
                                               348/14.08
2020/0110572 A1 *   4/2020   Lenke ..................... G06F 3/167
2020/0358628 A1 *  11/2020   Achyuth .............. H04M 3/568

OTHER PUBLICATIONS

"International Search Report and Written Opinion Issued in PCT Application No. PCT/US21/050953", Mailed Date: Dec. 1, 2021, 12 Pages.
Office Action Received for United Kingdom Application No. 2014713. 8, mailed on Dec. 10, 2024, 6 pages.
Communication under Rule 71(3) EPC as received in European application No. 21783373.0 dated Oct. 23, 2025.

* cited by examiner

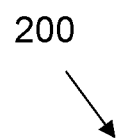

200

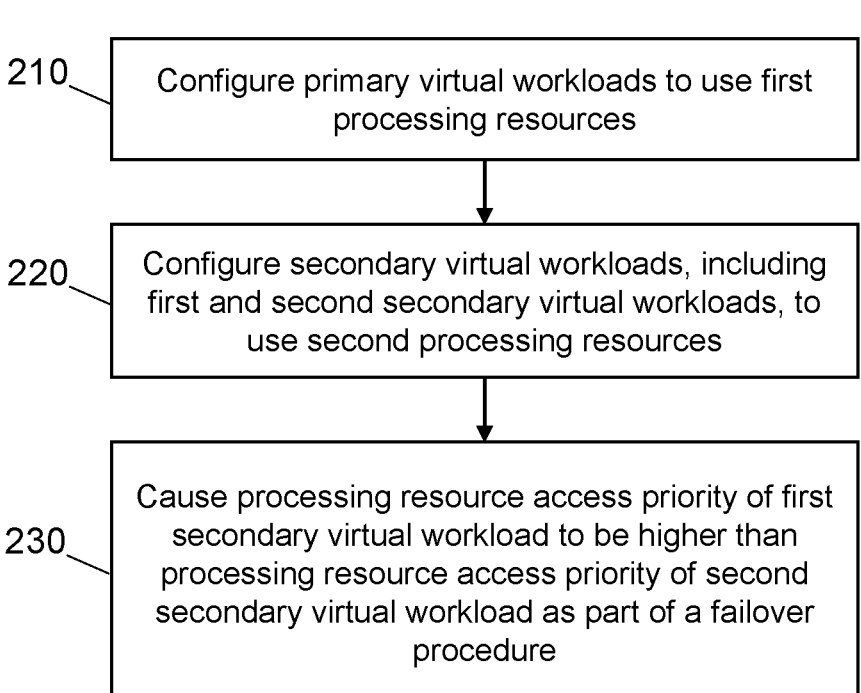

210 — Configure primary virtual workloads to use first processing resources

220 — Configure secondary virtual workloads, including first and second secondary virtual workloads, to use second processing resources 230 — Cause processing resource access priority of first secondary virtual workload to be higher than processing resource access priority of second secondary virtual workload as part of a failover procedure

Fig. 2

CONFIGURING A VIRTUALISED ENVIRONMENT IN A TELECOMMUNICATIONS NETWORK

This application claims priority to PCT Application US2021/050953 filed Sep. 17 2021, which in turn claims priority to GB Application 2014713.8 filed Sep. 18, 2020, the content of which applications are hereby expressly incorporated herein by reference in its entirety.

TECHNICAL FIELD

The present disclosure relates to configuring a virtualised environment in a telecommunications network. In particular, but not exclusively, the present disclosure relates to configuring virtual workloads in a virtualised environment in a telecommunications network.

BACKGROUND

Telecommunications networks typically achieve redundancy by using servers in pairs. Servers may, for example, be implemented as virtual workloads (e.g. virtual machines) in a virtualised environment in the network. Within each pair, one server is initially configured, e.g. instantiated, to operate as an active server, and the other is initially configured to operate as a standby server. User load is directed to the active server and processed there. The active and the standby servers exchange communications, e.g. keep-alive messages, so that the standby server can detect failure of the active server, and also state, so that the standby server has the information required to take over processing from the active server if the active server fails. When the active server fails, the standby server detects the failure, redirects user traffic away from the active server to itself, and takes over the data processing tasks previously performed by the active server, using the state previously replicated from the active server. As such, the server initially configured as a standby becomes an active server, and the server initially configured as an active may become a standby server. This architecture is known as 'active/standby', an 'N+N', or an 'N×(1:1)' configuration, in that there are N pairs of servers only one of each pair of which is active at any given time.

However, during normal processing, the standby servers use and/or reserve more resources than are needed merely to perform state replication and exchange keep-alive messages. For example, during normal processing, a standby server may require only a fraction (e.g. a quarter) of the resources required by an active server that is processing user load. The standby server is still allocated the same amount of resources as its associated active server, however, to ensure that the standby server can take over processing tasks from the active server when required to do so. This configuration therefore involves an inefficient use of resources, e.g. hardware. Such an inefficient use of resources is undesirable, particularly as the number of servers is scaled up. This may be a particular consideration with virtualised environments, where the number of pairs of virtual workloads (acting as active/standby servers) may be high.

It is therefore desirable to provide improved methods for configuring a virtualised environment in a telecommunications network and/or for providing redundancy in a telecommunications network.

SUMMARY

According to a first aspect, there is provided a method of configuring a virtualised environment in a telecommunications network, the method comprising: configuring a plurality of primary virtual workloads, including a first primary virtual workload, to use first processing resources on at least one host device in the network; configuring a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

According to a second aspect, there is provided an apparatus for use in configuring a virtualised environment in a telecommunications network, the apparatus being configured to: configure a plurality of primary virtual workloads, including a first primary virtual workload, to use first processing resources on at least one host device in the network; configure a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, cause, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

According to a third aspect, there is provided a computer program comprising a set of instructions, which, when executed by a computerised device, cause the computerised device to perform a method of configuring a virtualised environment in a telecommunications network, the method comprising: configuring a plurality of primary virtual workloads, including a first primary virtual workload, to use first processing resources on at least one host device in the network; configuring a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

According to a fourth aspect, there is provided a method of configuring a virtualised environment in a telecommunications network, the method comprising: configuring a plurality of standby virtual workloads, including a first standby virtual workload and a second standby virtual workload, to use initial processing resources on at least one host device in the network, each of the plurality of standby virtual workloads being associated with a respective one of a plurality of active virtual workloads configured on at least one host device in the network, the plurality of active virtual workloads including a first active virtual workload, wherein the standby virtual workloads are configured to contend with one another for access to the initial processing resources; and in response to a failure event associated with the first active virtual workload, causing, as part of a failover procedure between the first active virtual workload and the first standby virtual workload, a processing resource access priority of the first standby virtual workload to be higher than a processing resource access priority of the second standby virtual workload, such that additional processing resources on at least one host device in the network are available to the first standby virtual workload and not available to the second standby virtual workload. According to a fifth aspect, there is provided a method of performing a failover procedure in a virtualised environment in a telecommunications network, the virtualised environment comprising: a plurality of primary virtual workloads, including a first primary virtual workload, configured to use first processing resources on at least one host device in the network; a plurality of secondary virtual workloads, including a first secondary virtual workload and a second secondary virtual workload, configured to use second processing resources on at least one host device in the network, each of the plurality of secondary virtual workloads being associated with a respective one of the primary virtual workloads, wherein the secondary virtual workloads are configured to contend with one another for access to the second processing resources, the method comprising: in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

It should be appreciated that features described in relation to one aspect of the present disclosure may be incorporated into other aspects of the present disclosure. For example, a method aspect may incorporate any of the features described with reference to an apparatus aspect and vice versa.

DESCRIPTION OF THE DRAWINGS

Embodiments of the present disclosure will now be described by way of example only with reference to the accompanying schematic drawings of which:

FIG. 2 shows a flow chart depicting a method according to embodiments of the present disclosure.

DETAILED DESCRIPTION

Figure 1A:
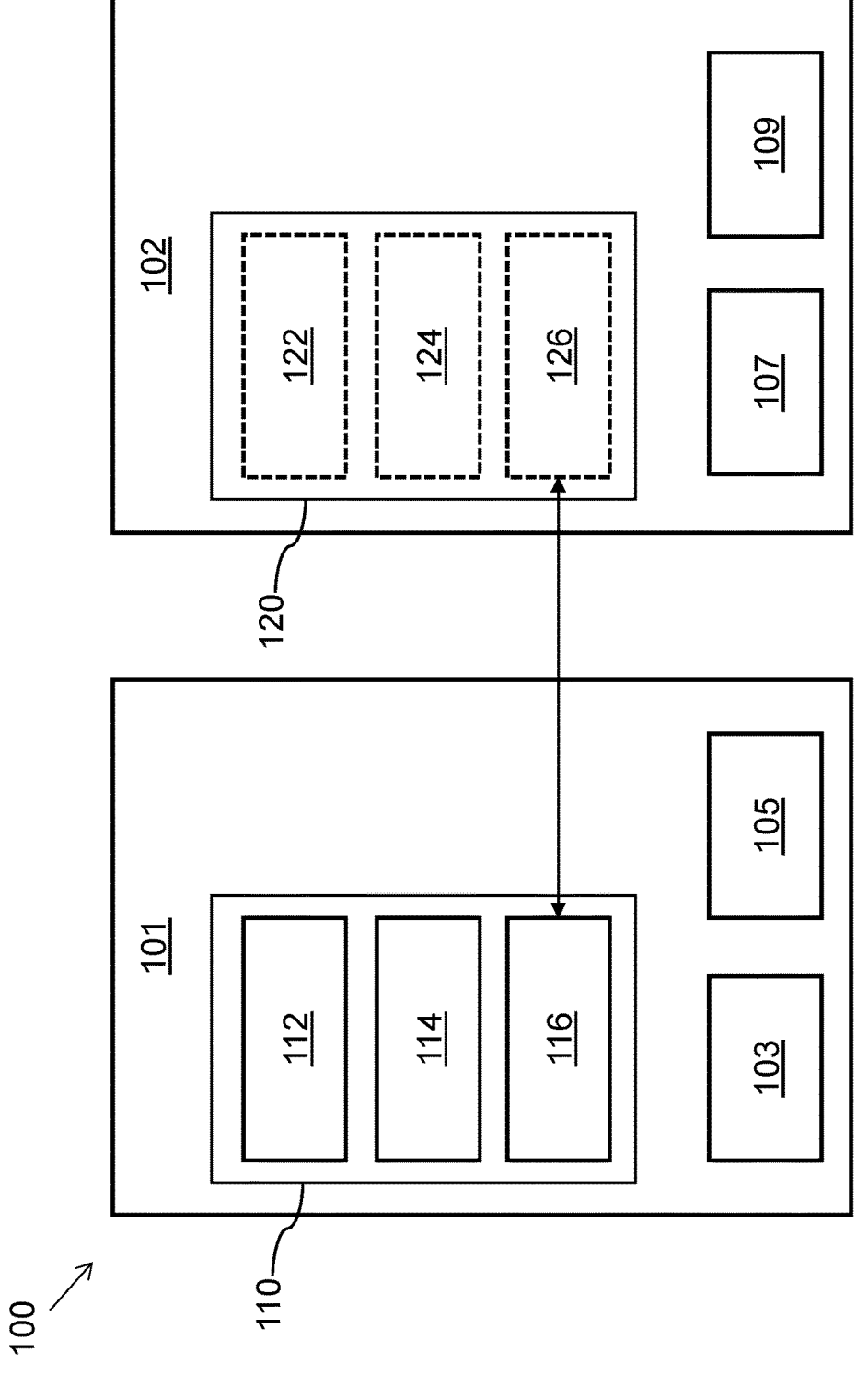
FIGS. 1A and 1B show a schematic view of a telecommunications network according embodiments of the present disclosure.
Figure 1B:
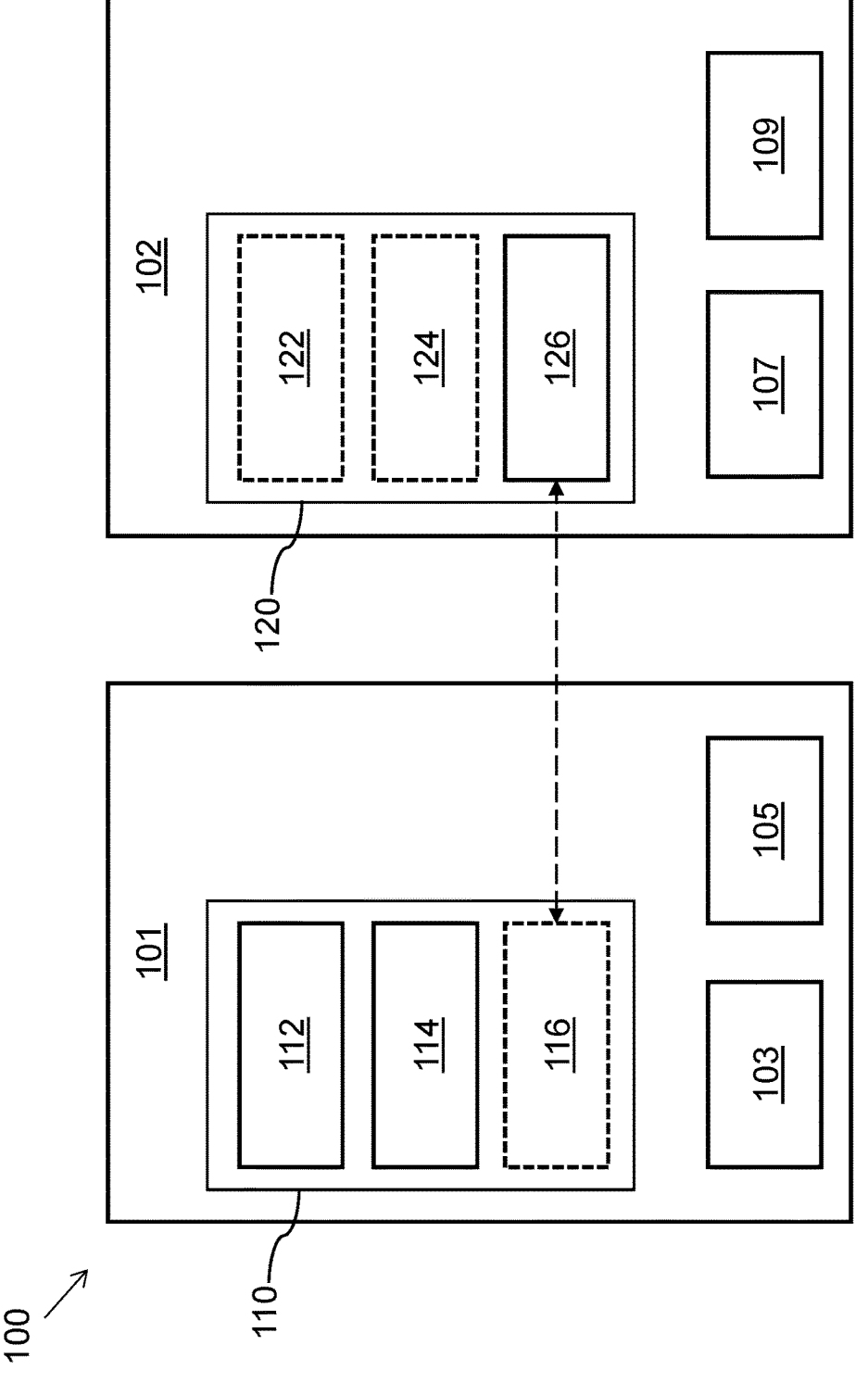

FIGS. 1A and 1B show a telecommunications network 100, according to embodiments.

The network 100 includes first and second host devices 101, 102. The host devices 101, 102 may comprise servers or other such computing devices, and may be located in a data centre or cloud computing environment (either distributed or non-distributed) with one or more other host devices (not shown). The first and second host devices 101, 102 may be co-located or located remotely relative to one another. The first and second host devices 101, 102 may be located in separate physical networks, in some cases.

The first host device 101 comprises first processing resources 110 and the second host device 102 comprises second processing resources 120. The first and second processing resources comprise physical processing resources, e.g. in the form of a plurality of processing cores which are capable of carrying out various data processing tasks. In some examples, the processing cores comprise central processing unit (CPU) cores.

In some cases, at least some of the first processing resources 110 are comprised on multiple host devices, e.g. the second host device 102, and/or at least some of the second processing resources 120 are comprised on another host device, e.g. the first host device 101.

Each of the host devices 101, 102 comprises a respective controller 105, 109 for controlling configuration and allocation of physical processing resources of the host device to one or more virtual workloads. The controllers 105, 109 comprise one or more processors, processing systems and/or microcontrollers. In some examples, at least one of the controllers 105, 109 comprises a virtualisation tool such as a hypervisor. A hypervisor may run top of an existing operating system on the respective host device, or it may run directly on the host device hardware without an intermediate operating system (in a so-called 'bare metal' configuration). In some examples, the hypervisor (not shown) comprises packet forwarding functionality. In some examples, a software tool such as OpenStack™ is used to run virtual workloads on the respective host device with a hypervisor. In some examples, the host device is configured with a Linux kernel, and/or may host the virtual workloads through use of the virtualisation tool Linux Containers (LXC).

In some examples, at least one of the controllers 105, 109 is external to its respective host device 101, 102. In some cases, a single controller (e.g. the controller 109) controls the configuration and allocation of physical processing resources to virtual workloads for both host devices 101, 102.

Each of the host devices 101, 102 also comprises a memory 103, 107, which may comprise volatile and/or non-volatile memory. The processing resources, memory and controller of a given host device may be connected together by one or more data buses (not shown).

On the first host device 101, primary virtual workloads 112, 114, 116 are configured to use the first processing resources 110. Each of the primary virtual workloads 112, 114, 116 is configured to use a respective portion of the first processing resources 110 (e.g. a predetermined number of cores). Each of the primary virtual workloads is configured to have exclusive access to its allocated portion of the first processing resources 110. The primary virtual workloads 112, 114, 116 are initially configured as active virtual workloads. The primary virtual workloads 112, 114, 116 may be configured to operate as virtual servers to process user traffic. A given primary virtual workload may be configured to operate as a network element or function such as a session border controller (SBC), for example. A given primary virtual workload may be configured to operate as a virtual network function (VNF).

On the second host device 102, secondary virtual workloads 122, 124, 126 are configured to use the second processing resources 120. Each of the secondary virtual workloads is configured to use a respective portion of the second processing resources 120 (e.g. a predetermined number of cores). Each of the secondary virtual workloads is configured to have exclusive access to its allocated portion of the second processing resources 120. The secondary virtual workloads 122, 124, 126 are initially configured as standby virtual workloads.

Each secondary virtual workload is configured to provide redundancy for a respective primary virtual workload. In this example, secondary virtual workload 126 is associated with, and provides redundancy for, primary virtual workload 116. The primary virtual workload 116 and the secondary virtual workload 126 exchange keep-alive messages and state. When the primary virtual workload 116 fails, e.g. due to failure of a host device on which the primary virtual workload is running, the secondary virtual workload 126 detects the failure, redirects user traffic away from the primary virtual workload 116 to itself, and takes over the data processing tasks previously performed by the primary virtual workload 116, using the state previously replicated from the primary virtual workload 116.

This is referred to as a failover procedure between the primary virtual workload 116 and its associated secondary virtual workload 126, and is depicted in FIG. 1B. Such a failover procedure may be triggered by the interruption of communications, such as keep-alive or heartbeat messages, between the primary virtual workload 116 and its associated secondary workload 126.

The configuration shown in FIGS. 1A and 1B is an 'active/standby', 'N+N', or 'Nx(1:1)' configuration, in that there are N pairs of virtual workloads, each having dedicated processing resources allocated to it. In the example shown in FIGS. 1A and 1B, the first processing resources 110 comprise the same amount of resources as the second processing resources 120. For example, the first and second processing resources 110, 120 may comprise the same number of cores. This is to ensure that each standby virtual workload has sufficient capacity to take over from an active virtual workload when required.

However, as discussed above, the standby virtual workloads use and/or reserve more resources than are needed during normal processing. A standby virtual workload may actually require only a fraction of the resources required by an active virtual workload during normal processing. The model described with reference to FIGS. 1A and 1B therefore involves an inefficient use of resources, e.g. hardware.

An alternative to the 'Nx(1:1)' model is an 'N+k' model, where there are N active workloads but only k standby workloads, with k<N, and any one of the k is able to handle work from any one of the N. Within this model there are active/active and active/standby variants. In an active/active configuration, all N+k workloads handle load at all times, and up to k workloads can fail with their work redistributed across the remaining N workloads. In an active/standby configuration, only N workloads are active, and k workloads are idle, and when one of the N active workloads fails its entire load is redistributed to, for example, any single one of the k standbys.

Telecommunications providers typically favour the 'Nx (1+1)' configuration. This is because telecommunications protocols often dictate that active servers expose a single internet protocol (IP) address for all incoming work, and provide no way to quickly spread that work across multiple IP addresses if the active server fails. This means that work is failed over at the unit of the server, which rules out active/active models. The IP address could be load balanced across multiple back-end servers which process the work in active/active fashion, but this merely shifts the problem back to the load balancer itself.

An active/standby N+k model is a more complex configuration to implement in a telecommunications network, as it requires all state from the N workloads to be replicated to all of the k workloads, and requires careful orchestration of failovers. If a telecommunications network provider starts from a 1+1 configuration and scales up, an Nx (1:1) model is easier to implement (merely by adding additional pairs) than an active/standby N+k model.

Web providers have typically favoured an active/active N+k model. This is because of the ability of clients to use DNS to spread load across a pool and to retry to a different server in the event of failure. An active/active N+k configuration may be easy to upgrade and scale, and reduces hardware costs compared to an Nx (1:1) model. However, changing an Nx (1:1) architecture to an active/active N+k configuration is expensive and complex. As well as having to redistribute IP addresses evenly across remaining workloads in the case of failure, state may have to be replicated across all servers (i.e. broadcast to all standbys, resulting in capacity problems). Alternatively, state may be broken out into a separate tier, resulting in a two-tier architecture having a stateless tier and a separate stateful tier. Both of these alternatives are difficult and/or complicated to implement.

Embodiments of the present disclosure will now be described, which enable N+N workloads to be deployed using N+k's worth of resources. This avoids a complete re-architecting of the existing Nx(1:1) model, but results in hardware savings associated with using fewer resources. Embodiments comprise measures, including methods, apparatus and computer programs, for use in configuring virtual workloads on host devices comprising processing resources. Such embodiments will be described with reference to FIG. 2 and FIGS. 3A and 3B.

Figure 3A:
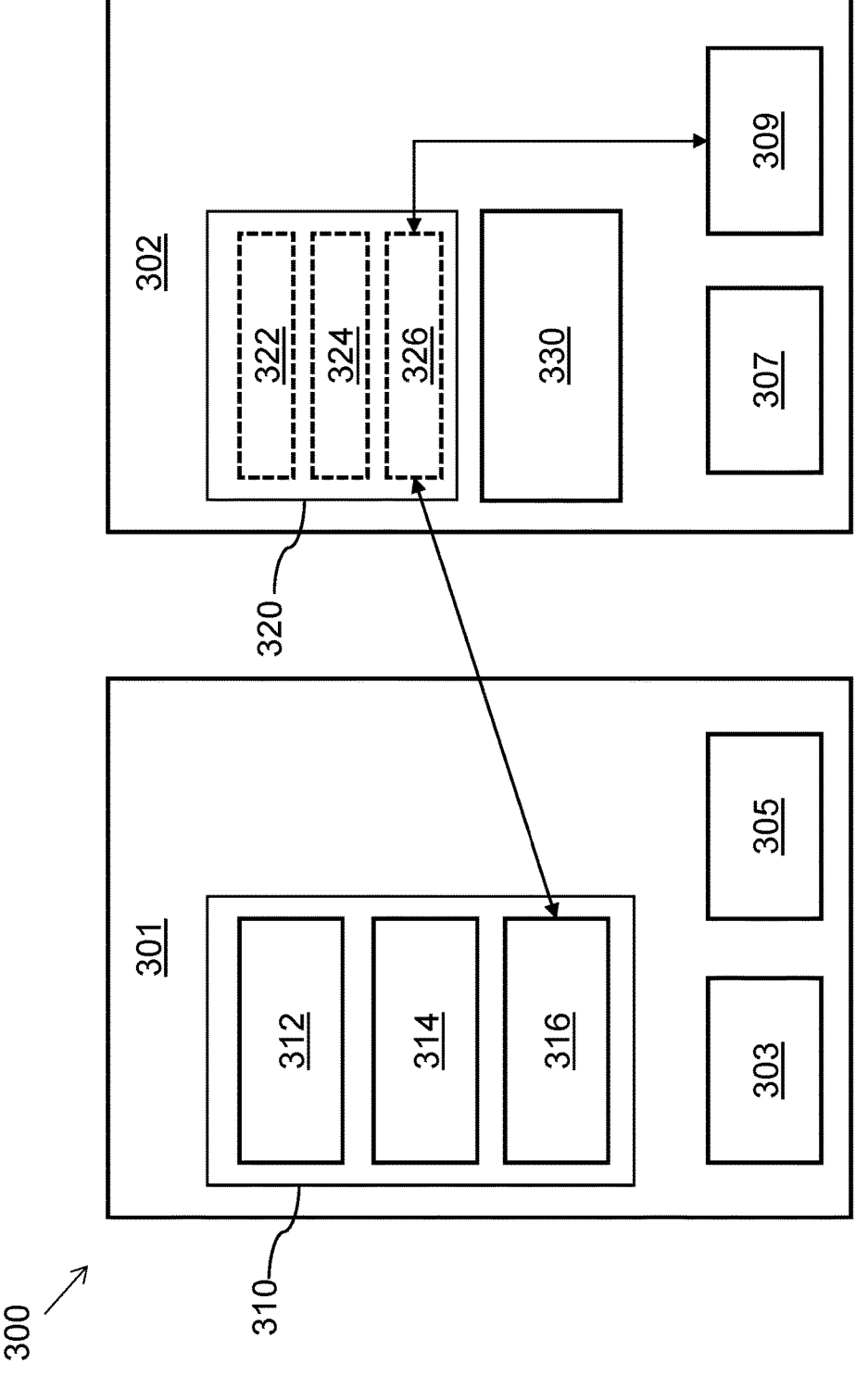
FIGS. 3A and 3B show a schematic view of a telecommunications network according to embodiments of the present disclosure.
Figure 3B:
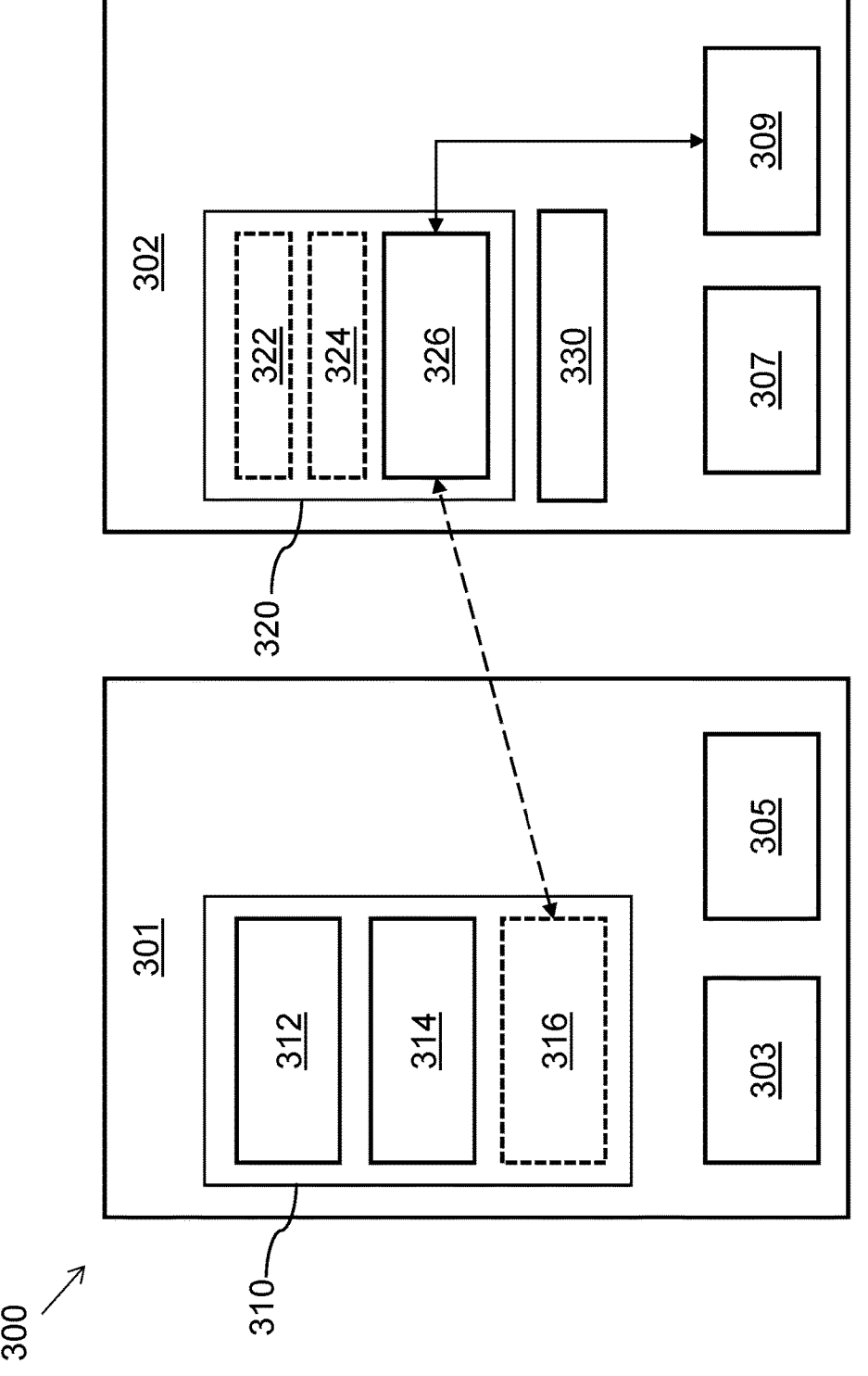

FIG. 2 shows a method 200 of configuring a virtualised environment in a telecommunications network, according to embodiments. A network 300 suitable for implementing the method 200 is shown in FIGS. 3A and 3B. Some elements of the network 300 are similar to elements described with reference to the telecommunications network 100 shown in FIGS. 1A and 1B. Corresponding reference numerals, incremented by 200, are used for similar items. The method 200 may be performed in other networks in other embodiments.

At item 210, a plurality of primary virtual workloads 312, 314, 316 are configured to use first processing resources 310 on at least one host device 301 in the network 300. The plurality of primary virtual workloads 312, 314, 316 includes a first primary virtual workload 316. Configuring a given virtual workload may comprise instantiating the virtual workload, for example. Although three primary virtual workloads are depicted in FIG. 3A, it will be understood that any number of primary virtual workloads may be configured to run on the host device 301. In some embodiments, the primary virtual workloads 312, 314, 316 are configured in a distributed manner across a plurality of host devices.

At item 220, a plurality of secondary virtual workloads 322, 324, 326 are configured to use second processing resources 320 on at least one host device 302 in the network. The plurality of secondary virtual workloads 322, 324, 326 includes a first secondary virtual workload 326 and a second secondary virtual workload 324. Although three secondary virtual workloads are depicted in FIG. 3A, it will be understood that any number of secondary virtual workloads may be configured to run on the host device 302. In some embodiments, the secondary virtual workloads 322, 324, 326 are configured in a distributed manner across a plurality of host devices.

Although FIG. 3A shows the host device 301 hosting the primary virtual workloads 312, 314, 316 being different from the host device 302 hosting the secondary virtual workloads 322, 324, 326, in alternative embodiments the host device(s) hosting primary virtual workloads may be the same as the host device(s) hosting secondary virtual workloads. A given host device may host primary virtual workloads, secondary virtual workloads, or both primary and secondary virtual workloads. In embodiments in which a host device hosts both primary virtual workloads and secondary virtual workloads, each host device in the environment may be identically configured.

A first primary virtual workload 316 is associated with a first secondary virtual workload 326. As such, the first secondary virtual workload 326 is configured to take over processing tasks from the first primary virtual workload 316 when the first primary virtual workload 326 fails, for example as part of a failover procedure.

In embodiments, the second processing resources 320 comprise fewer resources than the first processing resources 310. The secondary virtual workloads 322, 324, 326 are configured such that each secondary virtual workload has sufficient resources for state replication. During normal operation (shown in FIG. 3A), each secondary virtual workload consumes only replicated state. Fewer processing resources are therefore required for the secondary virtual workloads compared to the primary virtual workloads. The secondary virtual workloads 322, 324, 326 are configured to contend with one another for access to the second processing resources 320. As such, the secondary virtual workloads are configured to have non-exclusive access to resources in the second processing resources 320. This is in contrast with the example described with reference to FIGS. 1A and 1B, in which each secondary virtual workload 122, 124, 126 has exclusive (i.e. non-contentious) access to a portion of the second processing resources 120.

The second host device 302 also comprises additional processing resources 330. In embodiments, the additional processing resources 330 are separate from the second processing resources 320. In alternative embodiments, at least some of the additional processing resources 330 are comprised in the second processing resources 320. The additional processing resources 330 provide additional capacity to allow one or more of the secondary virtual workloads 322, 324, 326 to take over processing from a primary virtual workload (e.g. to transition from a standby workload to an active workload). In alternative embodiments, the additional processing resources 330 are provided on at least one different host device than the second host device 302.

At item 230, in response to a failure event associated with the first primary virtual workload 316, a processing resource access priority of the first secondary virtual workload 326 is caused to be higher than a processing resource access priority of the second secondary virtual workload 324, such that additional processing resources on at least one host device in the network are available to the first secondary virtual workload 326 and not available to the second secondary virtual workload 324. The causing is part of a failover procedure between the first primary virtual workload 316 and the first secondary virtual workload 326.

As shown in FIG. 3B, when the first primary virtual workload 316 fails, the first secondary virtual workload 326 detects the failure based on interruption of keep-alive messages from the first primary virtual workload 316 (depicted with a dashed line). To enable the first secondary virtual workload 326 to become an active virtual workload, at least some of the additional processing resources 330 are made available to the first secondary virtual workload 326. The amount of resources (e.g. cores) available to the first secondary virtual workload 326 thus dynamically increases as part of the failover procedure, whereas the amount of resources available to the other secondary virtual workloads 322, 324 does not increase. As such, the first secondary virtual workload 326 can be considered to dynamically 'grow' as it takes on processing tasks from the first primary virtual workload 316.

The additional processing resources 330 are made available to the first secondary virtual workload 326 based on a processing resource access priority of the first secondary virtual workload 326. In embodiments, the processing resource access priority is a Linux cgroups priority. The processing resources access priority of each secondary virtual workload 322, 324, 326 may be configured and/or adjusted by the controller 309 of the second host device 302. During normal operation (as shown in FIG. 3A), the processing resource access priority of each of the secondary virtual workloads 322, 324, 326 may be the same, and/or may be a default processing resource access priority. As part of a failover procedure involving the first secondary virtual workload 326 (as shown in FIG. 3B), the controller 309 causes the processing resource access priority of the first secondary virtual workload 326 to be higher than the processing resource access priority of at least one of the other secondary virtual workloads 322, 324. This means that the first secondary virtual workload 326 can use additional processing resources without interruption or contention from the other secondary virtual workloads 322, 324.

Therefore, by use of embodiments, the fundamental architecture of the N×(1:1) model, where each primary workload has an associated secondary workload to provide redundancy, is preserved, but is able to operate using N+k's worth of physical resources, where k<N. Using fewer physical resources results in a cost reduction, as well as a reduction in associated carbon emissions. Further, the complexities, costs and problems associated with a complete re-architecting of an N× (1:1) system to an N+k model are avoided.

The amount of processing resources available to a given virtual workload is dependent on three factors: an amount of resources (e.g. virtual CPUs) allocated to the virtual workload; whether the virtual workload has exclusive access to those resources; and if it does not have exclusive access, the processing resource access priority of the virtual workload. In known systems, only the first two of these factors is used. That is, virtual workloads are launched with a set number of cores, and options which exclude other virtual workloads from using those cores. The number of cores allocated to a particular virtual workload may be changed by a hypervisor, but this involves restarting the virtual workload. This process is too slow to be useful for a failover, where a standby workload is required to take over processing very rapidly (e.g. on the order of ~10 ms). Similarly, dynamically changing exclusivity is not an operation supported by known cloud networks. In embodiments described herein, however, the primary virtual workloads have exclusive access to the resources allocated to them, whereas the secondary virtual workloads have non-exclusive access to the resources allocated to them, and have processing resource access priorities which may be adjusted as required, during operation of the virtual workloads (without having to restart the virtual workloads). This allows the secondary virtual workloads to dynamically grow or shrink in the timescales required for a failover. In particular, the processing resource access priority of a given secondary virtual workload may be adjusted quickly (within a few milliseconds) when a failover is required. This means that the secondary virtual workload can be allocated fewer resources initially, since it is given the ability to rapidly grow as and when required. Hence, in embodiments, fewer resources are required overall.

In embodiments, prior to the failure event, the processing resource access priority of the first secondary virtual workload 326 is the same as the processing resource access priority of the second secondary virtual workload 324. As such, prior to the failure event, the first secondary virtual workload 326 does not have preferential access to the additional processing resources 330 over the second secondary virtual workload 324. In some embodiments, neither of the secondary virtual workloads 324, 326 has access to the additional processing resources 330 prior to the failure event. In other embodiments, both of the secondary virtual workloads 324, 326 have access to the additional processing resources 330 prior to the failure event.

In embodiments, the configuring the plurality of secondary virtual workloads performed at item 220 comprises configuring the first and/or the second secondary virtual workload to have a default processing resource access priority. The default processing resource access priority for the first secondary virtual workload 326 may be the same as or different from the default processing resource access priority for the second secondary virtual workload 324. The default processing resource access priority may be a maximum or a minimum processing resource access priority, according to embodiments. In alternative embodiments, the first and/or second secondary virtual workloads are not configured with an initial processing resource access priority.

In embodiments, the causing step performed at item 230 comprises adjusting the processing resource access priority of the first secondary virtual workload 326 and/or the processing resource access priority of the second secondary virtual workload 324. For example, the processing resource access priority of the first secondary virtual workload 326 may be increased and/or the processing resource access priority of the second secondary virtual workload 324 may be decreased. Adjusting the processing resource access priority of the first and/or second secondary virtual workloads 324, 326 may be performed by the controller 309 of the host device 302, which may comprise a hypervisor, for example.

In embodiments, the causing step performed at item 230 comprises the first secondary virtual workload 326 generating a request for access to the additional processing resources 330. The first secondary virtual workload 326 may output a signal to the controller 309, for example. In embodiments, the first secondary virtual workload 326 outputs the request using a network socket, e.g. an IP socket. In some embodiments, the first secondary virtual workload 326 outputs the request to a directory, e.g. in a file system associated with the first secondary virtual workload 326, which can be read by the controller 309. In embodiments, the request is generated in response to an interruption of communications between the first primary virtual workload 316 and the first secondary virtual workload 326. In embodiments, the request is sent to the controller 309, to cause the controller to adjust the processing resource access priority of the first secondary virtual workload 326 and/or the processing resource access priority of the second secondary virtual workload 324.

As such, the causing step performed at item 230 may be performed at least in part by the first secondary virtual workload 326 (by generating a request for access to the additional resources) and/or by the controller 309 (by adjusting the processing resource access priority of at least one of the secondary virtual workloads).

In embodiments, the configuring the plurality of primary virtual workloads performed at item 210 comprises initially configuring each primary virtual workload as an active virtual workload. The primary virtual workloads may be tagged with cloud metadata designating them as active virtual workloads, for example. In such embodiments, the configuring the plurality of secondary virtual workloads performed at item 220 comprises initially configuring each secondary virtual workload as a standby virtual workload (e.g. by tagging with cloud metadata). Each standby virtual workload is associated with a respective active virtual workload.

In embodiments, the configuring the plurality of primary virtual workloads performed at item 210 comprises configuring the first primary virtual workload 316 to have exclusive access to a portion of the first processing resources 310. As such, the plurality of primary virtual workloads are configured not to contend with one another for access to the first processing resources 310. This is in contrast with the secondary virtual workloads, which are configured to contend with one another for access to the second processing resources 320. During normal operation, the primary virtual workloads are configured as active virtual workloads. Therefore, during normal operation, the primary virtual workloads require and use the full processing resources associated with being an active virtual workload, e.g. processing user traffic.

In embodiments, the plurality of primary virtual workloads are configured on a first host device in the network, and the plurality of secondary virtual workloads are configured in a distributed manner between a plurality of second host devices in the network. This ensures that, if the first host device fails, a single host device hosting standby virtual workloads is not overwhelmed by multiple standby virtual workloads trying to become active at the same time. As such, while each primary virtual workload has an associated secondary virtual workload (consistent with an Nx (1:1) architecture), this does not mean that the primary virtual workloads on a given host device are necessarily associated with secondary virtual workloads on a single host device. For example, the primary virtual workloads 312, 314 shown in FIG. 3A may be associated with secondary virtual workloads hosted on other host devices (not shown) instead of on host device 302, in some embodiments. Thus, if the host device 301 fails, the host device 302 is not overwhelmed by having multiple secondary virtual workloads all trying to access additional resources on the host device 302. In alternative embodiments, the primary virtual workloads on a given host device are associated with secondary virtual workloads on a single host device. For example, the primary virtual workloads 312, 314 may be associated with the secondary virtual workloads 322, 324, respectively.

In embodiments, the method 200 comprises triggering the failover procedure in response to an interruption of communications between the first primary virtual workload and the first secondary virtual workload. For example, the first secondary virtual workload 326 may detect an absence of keep-alive messages from the first primary virtual workload 316 and, in response, trigger the failover procedure to redirect user traffic to the first secondary virtual workload 326. As part of the failover procedure, the resource access priority of the first secondary virtual workload 326 is made higher than that of other secondary virtual workloads hosted on the host device 302, to enable the first secondary virtual workload 326 to access additional resources that are required for it to function as an active workload.

In embodiments, the method 200 comprises further causing, as part of a failover recovery procedure between the first primary virtual workload 316 and the first secondary virtual workload 326, the first processing resource access priority of the first secondary virtual workload 326 to be the same as the processing resource access priority of the second secondary virtual workload 324. The failover recovery procedure is performed after the failover procedure and after first primary virtual workload 316 has regained its previously failed functionality (for example after a reboot/reset). The failover recovery procedure involves the first primary virtual workload 316 re-assuming the processing tasks that were temporarily taken up by the first secondary virtual workload 326. In embodiments, the controller 309 adjusts one or both of the processing resource access priority of the first secondary virtual workload 326 and processing resource access priority of the second secondary virtual workload 324 as part of the failover recovery procedure. For example, the controller 309 may reduce the processing resource access priority of the first secondary virtual workload 326. As such, the processing resource access priorities may be effectively reset to their initial values to resume normal (pre-failover) operation.

In embodiments, causing the processing resource access priority of the first secondary virtual workload to be higher than the processing resource access priority of the second secondary virtual workload is performed in response to an interruption of communications (e.g. keep-alive messages) between the first primary virtual workload and the first secondary virtual workload. In such embodiments, the causing the processing resource access priority of the first secondary virtual workload to be the same as the processing resource access priority of the second secondary virtual workload is performed in response to a reestablishment of communications between the first primary virtual workload and the first secondary virtual workload. For example, when the first secondary virtual workload 326 detects that communications with the first primary virtual workload 316 have resumed, the first secondary virtual workload 326 may request that its processing resource access priority is lowered.

In embodiments, the failover recovery procedure is triggered in response to a reestablishment of communications between the first primary virtual workload and the first secondary virtual workload. As such, the failover recovery procedure is triggered as soon as possible after the first primary virtual workload 316 has re-established contact with the first secondary virtual workload 326, and/or has caught up with state replication. Hence, the first secondary virtual workload 326 pro-actively transfers service back to the first primary virtual workload 316 as soon as the pair have re-established communications and the first primary virtual workload 316 has caught up with state replication. In embodiments, there may only be enough spare capacity on the host device 302 for a small number of secondary virtual workloads to function as active workloads (due to the additional resources required to operate as an active workload). Therefore, by transferring service back to the first primary virtual workload 316 as quickly as possible, the first secondary virtual workload 326 can reduce its amount of consumed and/or reserved resources, thereby allowing other secondary virtual workloads on the host device 302 to become active if required to do so.

In embodiments, at least some of the additional processing resources 330 are not comprised in the second processing resources 320. This enables the first secondary virtual workload 326 to 'grow' without reducing the resources already available to the other secondary virtual workloads 322, 324 on the host device 302. This ensures that the other secondary virtual workloads 322, 324 on the host device 302 can still perform state replication and function as standby virtual workloads.

However, in some embodiments, the second processing resources 320 comprise at least some of the additional processing resources. Therefore, when the first secondary virtual workload 326 dynamically 'grows' by taking on additional processing resources, one or more of the other secondary virtual workloads 322, 324 on the host device 302 may 'shrink', in that fewer resources are available to them than during normal operation. This is acceptable if only a small number of secondary virtual workloads on the host device 302 are required to become active at a time, for example. When the first secondary virtual workload 326 subsequently 'shrinks' during the failover recovery procedure, the other secondary virtual workloads 322, 324 can 'grow', in that more resources become available to them. This configuration uses fewer physical resources overall than a case in which the additional processing resources 330 are separate from the second processing resources 320.

In embodiments, the causing performed at item 230 is performed at least in part using control groups (cgroups) functionality. This allows the resource access priorities of the secondary virtual workloads to be adjusted quickly and without needing to restart the secondary virtual workloads, thereby enabling access to the additional resources to be provided with low latency. This may be implemented using a full Linux operating system on a bare metal host, for example. The cgroups priority of a given virtual workload running on a host device can be configured and adjusted by a controller of the host device, e.g. an OpenStack™ agent running on the host layer. In alternative embodiments, a hypervisor running on the host (so-called "type 1 virtualization"), e.g. using VMWare™, is configured to dynamically manage and/or adjust the processing resource access priorities of the secondary virtual workloads.

In embodiments, at least one of the primary and secondary virtual workloads comprises a virtual machine. In embodiments, at least one of the primary and secondary virtual workloads comprises a container. The container may be configured using Kubernetes' functionality on a bare metal host, in some embodiments. The resource access priority for a container may be adjusted, e.g. at the host level. In some cases, some of the primary and/or secondary virtual workloads comprise virtual machines, and some of the primary and/or secondary virtual workloads comprise containers.

In embodiments, at least one of the primary and secondary virtual workloads comprises a virtual machine configured within a respective container. This may be implemented, for example, using Kubevirt™ functionality. Such embodiments allow existing products and/or network functions that use virtual machines to be run within containers. This may be less complicated to implement than changing such products and/or functions to operate directly with containers. The container comprises a hypervisor which runs a virtual machine image within the container. The hypervisor may be configured to adjust the resource access priority of the virtual machine. As such, priority adjustment is performed inside the container, rather than at the host level.

In embodiments, the first and the second processing resources comprise processing cores on at least one host device in the network. The processing cores may comprise CPU cores, for example. In alternative embodiments, the first and the second processing resources comprise random access memory (RAM) on at least one host device.

In embodiments, the second processing resources occupy fewer host devices than the first processing resources. For example, the plurality of primary virtual workloads may be hosted on four host devices (and require four host devices' worth of processing resources), whereas the plurality of secondary virtual workloads may be hosted on one host device. Thus, fewer host devices overall may be used, reserved and/or required compared to a case in which the second processing resources comprise the same amount of resources as the first processing resources.

As an illustrative example, a set of active virtual workloads may require 8 hosts' worth of resources, and a given standby virtual workload may consume ¼ of the resources of a given active virtual workload. To provide protection against one host failing, using a known N×(1:1) configuration, 8+8=16 hosts would be required. According to embodiments described herein, however, 8 hosts would be required for the active virtual workloads, 8/4=2 hosts' worth of resources would be required to run the standby virtual workloads, and if an active host fails enough capacity is required to allow ⅛th of the standby virtual workloads to go active, which adds another 0.75 hosts' worth of resources. This results in 3 designated standby hosts. Therefore, there are 11 hosts in total, instead of 16, a reduction of −30%.

The method 200 may comprise more, fewer or different steps in alternative embodiments. For example, in some embodiments, the method 200 does not include the configuring step of items 210 and/or the configuring step of item 220. In such embodiments, the primary and/or secondary virtual workloads are already configured (e.g. instantiated) and running on the host device(s) when the method is performed. As such, the method 200 may comprise a method for configuring virtual workloads, and/or a method for performing a failover procedure.

The host devices 301, 302, virtual workloads 312, 314, 316, 322, 324, 326, and/or controllers 305, 309 as described above may be comprised in or implemented in apparatus comprising at least one processor or processing system. The processing system may comprise one or more processors and/or memory. Each device, module, component, machine or function as described in relation to any of the examples described herein, for example the controller 309, may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments described above, the second processing resources comprise fewer resources than the first processing resources. In alternative embodiments, the second processing resources comprise the same number of resources as the first processing resources. In some such embodiments, the second processing resources comprise at least some of the additional processing resources. In alternative embodiments, a greater number of secondary virtual workloads may be provided than primary virtual workloads. In any case, the amount of resources reserved and/or used by each secondary virtual workload during normal operation (where the secondary virtual workloads operate as standbys) is less than the amount of resources reserved and/or used by each primary virtual workload.

Various measures (including methods, apparatus and computer programs) are provided configuring a virtualised environment in a telecommunications network. A plurality of standby virtual workloads, including a first standby virtual workload and a second standby virtual workload, are configured to use initial processing resources on at least one host device in the network. Each of the plurality of standby virtual workloads is associated with a respective one of a plurality of active virtual workloads configured on at least one host device in the network. The plurality of active virtual workloads includes a first active virtual workload. The standby virtual workloads are configured to contend with one another for access to the initial processing resources. In response to a failure event associated with the first active virtual workload, a processing resource access priority of the first standby virtual workload is caused to be higher than a processing resource access priority of the second standby virtual workload, as part of a failover procedure between the first active virtual workload and the first standby virtual workload, such that additional processing resources on at least one host device in the network are available to the first standby virtual workload and not available to the second standby virtual workload.

Various measures (including methods, apparatus and computer programs) are provided for performing a failover procedure in a virtualised environment in a telecommunications network. The virtualised environment comprises a plurality of primary virtual workloads, including a first primary virtual workload, configured to use first processing resources on at least one host device in the network. The virtualised environment also comprises a plurality of secondary virtual workloads, including a first secondary virtual workload and a second secondary virtual workload, configured to use second processing resources on at least one host device in the network. Each of the plurality of secondary virtual workloads is associated with a respective one of the primary virtual workloads. The secondary virtual workloads are configured to contend with one another for access to the second processing resources. In response to a failure event associated with the first primary virtual workload, a processing resource access priority of the first secondary virtual workload is caused to be higher than a processing resource access priority of the second secondary virtual workload, as part of a failover procedure between the first primary virtual workload and the first secondary virtual workload, such that additional processing resources on at least one host device in the network are available to the first secondary virtual workload and not available to the second secondary virtual workload.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

The disclosure presented herein also encompasses the subject matter set forth in the following clauses:

Clause 1. A method of configuring a virtualised environment in a telecommunications network, the method comprising:

configuring a plurality of primary virtual workloads, including a first primary virtual workload, to use first processing resources on at least one host device in the network;

configuring a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

Clause 2. A method according to clause 1, wherein, prior to the failure event, the processing resource access priority of the first secondary virtual workload is the same as the processing resource access priority of the second secondary virtual workload.

Clause 3. A method according to any preceding clause, wherein configuring the plurality of secondary virtual workloads comprises configuring the first and the second secondary virtual workload to have a default processing resource access priority.

Clause 4. A method according to any preceding clause, wherein the causing comprises adjusting the processing resource access priority of the first secondary virtual workload and/or the processing resource access priority of the second secondary virtual workload.

Clause 5. A method according to any preceding clause, wherein the causing comprises the first secondary virtual workload generating a request for access to the additional processing resources.

Clause 6. A method according to any preceding clause, wherein the plurality of primary virtual workloads are configured on a first host device in the network, and wherein the plurality of secondary virtual workloads are configured in a distributed manner between a plurality of second host devices in the network.

Clause 7. A method according to any preceding clause, wherein configuring the plurality of primary virtual workloads comprises configuring the first primary virtual workload to have exclusive access to a portion of the first processing resources.

Clause 8. A method according to any preceding clause, the method comprising further causing, as part of a failover recovery procedure between the first primary virtual workload and the first secondary virtual workload, the processing resource access priority of the first secondary virtual workload to be the same as the processing resource access priority of the second secondary virtual workload.

Clause 9. A method according to clause 8, wherein the causing is performed in response to an interruption of communications between the first primary virtual workload and the first secondary virtual workload, and wherein the further causing is performed in response to a reestablishment of communications between the first primary virtual workload and the first secondary virtual workload.

Clause 10. A method according to clause 8 or clause 9, comprising triggering the failover recovery procedure in response to a reestablishment of communications between the first primary virtual workload and the first secondary virtual workload.

Clause 11. A method according to any preceding clause, wherein the second processing resources comprise at least some of the additional processing resources.

Clause 12. A method according to any preceding clause, wherein at least some of the additional processing resources are not comprised in the second processing resources.

Clause 13. A method according to any preceding clause, wherein the causing the processing resource access priority of the first secondary virtual workload to be higher than the processing resource access priority of the second secondary virtual workload is performed at least in part using control groups functionality.

Clause 14. A method according to any preceding clause, wherein at least one of the primary and secondary virtual workloads comprises a virtual machine.

Clause 15. A method according to any preceding clause, wherein at least one of the primary and secondary virtual workloads comprises a container.

Clause 16. A method according to any preceding clause, wherein at least one of the primary and secondary virtual workloads comprises a virtual machine configured within a respective container.

Clause 17. A method according to any preceding clause, wherein the first and the second processing resources comprise processing cores on at least one host device in the network.

Clause 18. A method according to any preceding clause, wherein the second processing resources comprise fewer resources than the first processing resources.

Clause 19. A method according to any preceding clause, wherein the configuring the plurality of primary virtual workloads comprises initially configuring each primary virtual workload as an active virtual workload, and wherein the configuring the plurality of secondary virtual workloads comprises initially configuring each secondary virtual workload as a standby virtual workload.

Clause 20. A method according to any preceding clause, the method comprising triggering the failover procedure in response to an interruption of communications between the first primary virtual workload and the first secondary virtual workload.

Clause 21. Apparatus for use in configuring a virtualised environment in a telecommunications network, the apparatus being configured to:

configure a plurality of primary virtual workloads, including a first primary virtual workload, to use first processing resources on at least one host device in the network;

configure a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, cause, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

Clause 22. A computer program comprising a set of instructions, which, when executed by a computerised device, cause the computerised device to perform a method of configuring a virtualised environment in a telecommunications network, the method comprising:

configuring a plurality of primary virtual workloads, including a first primary virtual workload, to use first processing resources on at least one host device in the network;

configuring a plurality of secondary virtual workloads, including a first secondary virtual workload and a second secondary virtual workload, to use second processing resources on at least one host device in the network, each of the plurality of secondary virtual workloads being associated with a respective one of the primary virtual workloads, and wherein the secondary virtual workloads are configured to contend with one another for access to the second processing resources; and in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

Clause 23. A method of configuring a virtualised environment in a telecommunications network, the method comprising:

configuring a plurality of standby virtual workloads, including a first standby virtual workload and a second standby virtual workload, to use initial processing resources on at least one host device in the network, each of the plurality of standby virtual workloads being associated with a respective one of a plurality of active virtual workloads configured on at least one host device in the network, the plurality of active virtual workloads including a first active virtual workload, wherein the standby virtual workloads are configured to contend with one another for access to the initial processing resources; and in response to a failure event associated with the first active virtual workload, causing, as part of a failover procedure between the first active virtual workload and the first standby virtual workload, a processing resource access priority of the first standby virtual workload to be higher than a processing resource access priority of the second standby virtual workload, such that additional processing resources on at least one host device in the network are available to the first standby virtual workload and not available to the second standby virtual workload.

Clause 24. A method of performing a failover procedure in a virtualised environment in a telecommunications network, the virtualised environment comprising:

a plurality of primary virtual workloads, including a first primary virtual workload, configured to use first processing resources on at least one host device in the network; a plurality of secondary virtual workloads, including a first secondary virtual workload and a second secondary virtual workload, configured to use second processing resources on at least one host device in the network, each of the plurality of secondary virtual workloads being associated with a respective one of the primary virtual workloads, wherein the secondary virtual workloads are configured to contend with one another for access to the second processing resources, the method comprising:

in response to a failure event associated with the first primary virtual workload, causing, as part of a failover procedure between the first primary virtual workload and the first secondary virtual workload, a processing resource access priority of the first secondary virtual workload to be higher than a processing resource access priority of the second secondary virtual workload, such that additional processing resources on at least one host device in the network are available to the first secondary virtual workload and not available to the second secondary virtual workload.

The invention claimed is:

1. A method, executed by a computing system, for automating transitions for user interface formats for communication sessions, comprising:

causing a display of a first user interface format comprising a primary presentation region and an attendee image region, the primary presentation region comprising a display of presentation content and a rendering of a presenter user who assumes a presenter role, the attendee image region comprising individual renderings of video streams of a plurality of users individually communicating from remote computing devices, wherein the individual renderings each has a position relative to a seating configuration of a virtual environment, wherein the computing system allows the plurality of users to communicate through a communication session;

analyzing a video stream of a user of the plurality of users;

detecting, based on analyzing the video of the user, a gesture input of the user;

determining that the gesture input corresponds to a preset user request; and in response to the gesture input corresponding to the preset user request, or in response to an approval granted by another user receiving an indication of the input gesture:

causing a transition from a first operating state displaying the first user interface format to a second operating state displaying a second user interface format comprising the primary presentation region, the attendee image region and a secondary presentation region displaying a video stream of at least one user that provided the gesture input corresponding to the preset user request, the attendee image region of the second user interface format displaying a first graphical element in association with a rendering of the user to indicate the input provided by the user, the graphical element representing the gesture input.

2. The method of claim 1, wherein the second user interface format further comprises an attendee status region that includes one or more status indicators of individual users of the plurality of users, wherein the transition from the first operating state displaying the first user interface format to the second operating state displaying the second user interface format comprising adding a display of the attendee status region having a second graphical element representing the gesture input.

3. The method of claim 1, wherein an individual user depicted in the video stream represents a user that is next in a queue of users to be displayed in the primary presentation region.

4. The method of claim 1, wherein determining that the gesture input corresponds to the preset user request includes detecting that the user raised a hand in an upward direction.

5. The method of claim 1, wherein determining that the gesture input corresponds to the preset user request includes detecting that the user raised a hand in an upward direction raise a predetermined height.

6. The method of claim 1, wherein the secondary presentation region starts at a first position in response to the gesture input, the first position causing the secondary presentation region to overlap with at least a portion of a queue region, wherein secondary presentation region moves to a second position after a predetermined time, the second position causing the secondary presentation region to be in a non-overlapping arrangement with respect to the queue region.

7. The method of claim 1, wherein permission data is updated in response to the gesture input, the update granting the user with write permissions to the primary presentation region, wherein content of a file associated with the user is allowed to be rendered within the primary presentation region in response to the update granting the user with write permissions.

8. A system for automating transitions for user interface formats for communication sessions, the system comprising:

one or more processing units; and a computer-readable storage medium having encoded thereon computer-executable instructions to cause the one or more processing units to:

cause a display of a first user interface format comprising a primary presentation region and an attendee image region, the primary presentation region comprising a display of presentation content and a rendering of a presenter user who assumes a presenter role, the attendee image region comprising individual renderings of video streams of a plurality of users individually communicating from remote computing devices, wherein the individual renderings each has a position relative to a seating configuration of a virtual environment, wherein the system allows the plurality of users to communicate through a communication session;

analyze a video stream of a user of the plurality of users;

detect, based on analyzing the video of the user, a gesture input of the user;

determine that the gesture input corresponds to a preset user request; and in response to the gesture input corresponding to the preset user request, or in response to an approval granted by another user receiving an indication of the input gesture:

cause a transition from a first operating state displaying the first user interface format to a second operating state displaying a second user interface format comprising the primary presentation region, the attendee image region and a secondary presentation region displaying a video stream of at least one user that provided the gesture input corresponding to the preset user request, the attendee image region of the second user interface format displaying a first graphical element in association with a rendering of the user to indicate the input provided by the user, the graphical element representing the gesture input.

9. The system of claim 8, wherein the second user interface format further comprises an attendee status region that includes one or more status indicators of individual users of the plurality of users, wherein the transition from the first operating state displaying the first user interface format to the second operating state displaying the second user interface format comprising adding a display of the attendee status region having a second graphical element representing the gesture input.

10. The system of claim 8, wherein an individual user depicted in the video stream represents a user that is next in a queue of users to be displayed in the primary presentation region.

11. The system of claim 8, wherein determining that the gesture input corresponds to the preset user request includes detecting that the user raised a hand in an upward direction.

12. The system of claim 8, wherein determining that the gesture input corresponds to the preset user request includes detecting that the user raised a hand in an upward direction raise a predetermined height.

13. The system of claim 8, wherein the secondary presentation region starts at a first position in response to the gesture input, the first position causing the secondary presentation region to overlap with at least a portion of a queue region, wherein secondary presentation region moves to a second position after a predetermined time, the second position causing the secondary presentation region to be in a non-overlapping arrangement with respect to the queue region.

14. The system of claim 8, wherein permission data is updated in response to the gesture input, the update granting the user with write permissions to the primary presentation region, wherein content of a file associated with the user is allowed to be rendered within the primary presentation region in response to the update granting the user with write permissions.

15. A non-transitory computer-readable storage medium having encoded thereon computer-executable instructions for automating transitions for user interface formats for communication sessions, the instructions to cause one or more processing units of a system to:

cause a display of a first user interface format comprising a primary presentation region and an attendee image region, the primary presentation region comprising a display of presentation content and a rendering of a presenter user who assumes a presenter role, the attendee image region comprising individual renderings of video streams of a plurality of users individually communicating from remote computing devices, wherein the individual renderings each has a position relative to a seating configuration of a virtual environment, wherein the system allows the plurality of users to communicate through a communication session;

analyze a video stream of a user of the plurality of users;

detect, based on analyzing the video of the user, a gesture input of the user;

determine that the gesture input corresponds to a preset user request; and in response to the gesture input corresponding to the preset user request, or in response to an approval granted by another user receiving an indication of the input gesture:

cause a transition from a first operating state displaying the first user interface format to a second operating state displaying a second user interface format comprising the primary presentation region, the attendee image region and a secondary presentation region displaying a video stream of at least one user that provided the gesture input corresponding to the preset user request, the attendee image region of the second user interface format displaying a first graphical element in association with a rendering of the user to indicate the input provided by the user, the graphical element representing the gesture input.

16. The non-transitory computer-readable storage medium of claim 15, wherein the second user interface format further comprises an attendee status region that includes one or more status indicators of individual users of the plurality of users, wherein the transition from the first operating state displaying the first user interface format to the second operating state displaying the second user interface format comprising adding a display of the attendee status region having a second graphical element representing the gesture input.

17. The non-transitory computer-readable storage medium of claim 15, wherein an individual user depicted in the video stream represents a user that is next in a queue of users to be displayed in the primary presentation region.

18. The non-transitory computer-readable storage medium of claim 15, wherein determining that the gesture input corresponds to the preset user request includes detecting that the user raised a hand in an upward direction.

19. The non-transitory computer-readable storage medium of claim 15, wherein determining that the gesture input corresponds to the preset user request includes detecting that the user raised a hand in an upward direction raise a predetermined height.

20. The non-transitory computer-readable storage medium of claim 15, wherein the secondary presentation region starts at a first position in response to the gesture input, the first position causing the secondary presentation region to overlap with at least a portion of a queue region, wherein secondary presentation region moves to a second position after a predetermined time, the second position causing the secondary presentation region to be in a non-overlapping arrangement with respect to the queue region.

* * * * *